United States Patent

[11] 3,614,530

| [72] | Inventor | Paul Baltensperger<br>Wurenlos, Switzerland |
|---|---|---|
| [21] | Appl. No. | 839,454 |
| [22] | Filed | July 7, 1969 |
| [45] | Patented | Oct. 19, 1971 |
| [73] | Assignee | Aktiengesellschaft Brown, Boveri & Cie<br>Baden, Switzerland |
| [32] | Priority | Aug. 2, 1968 |
| [33] | | Switzerland |
| [31] | | 11622 |

[54] ARRANGEMENT FOR DAMPING ELECTRICAL OSCILLATIONS ON A HIGH-VOLTAGE ALTERNATING CURRENT TRANSMISSION LINE
5 Claims, 4 Drawing Figs.

[52] U.S. Cl. .................................................... 317/11 C,
307/93, 317/16, 317/20
[51] Int. Cl. .................................................... H02h 7/22
[50] Field of Search .......................................... 307/93;
317/20, 16, 11

[56] References Cited
UNITED STATES PATENTS
| 2,094,363 | 9/1937 | Little et al. .................. | 317/11 |
| 2,468,498 | 4/1949 | Kyle et al. .................... | 317/16 X |
| 3,168,681 | 2/1965 | Wilson ......................... | 317/16 X |

FOREIGN PATENTS
| 548,092 | 9/1942 | Great Britain ............... | 317/11 |

Primary Examiner—James D. Trammell
Attorney—Pierce, Scheffler & Parker

ABSTRACT: An arrangement for damping electrical oscillations on a high-voltage line formed in an oscillatory circuit constituted by a compensating inductive reactor and the capacitance of the line itself comprises with a resistance component arranged in series with the inductive reactor, and with this series circuit connected between the line and earth at the line side of a circuit breaker employed at one end of the line to connect and disconnect the line with respect to its source of power such as a power station. An auxiliary switch is paralleled with the resistance component. During a disconnection procedure, the main circuit breaker and the auxiliary switch shunting the resistance component open practically simultaneously so that the resistance component becomes effective for a brief duration after which it recloses the shunt path around the resistance component. The resistance component and its shunting switch are structurally associated with the reactor component and its casing and can be mounted either on the exterior of or within this casing.

PATENTED OCT 19 1971  3,614,530
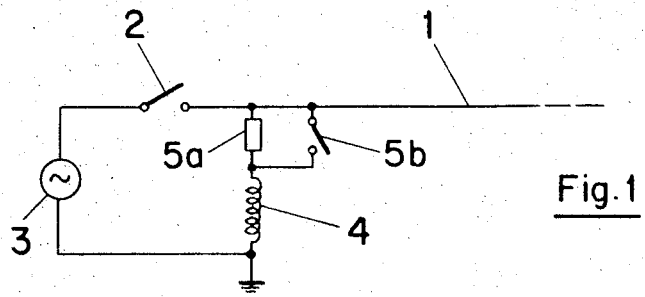
Fig.1
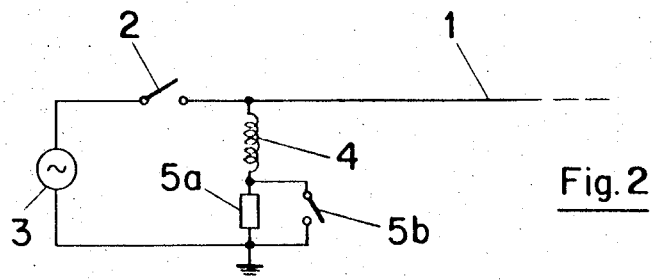
Fig.2
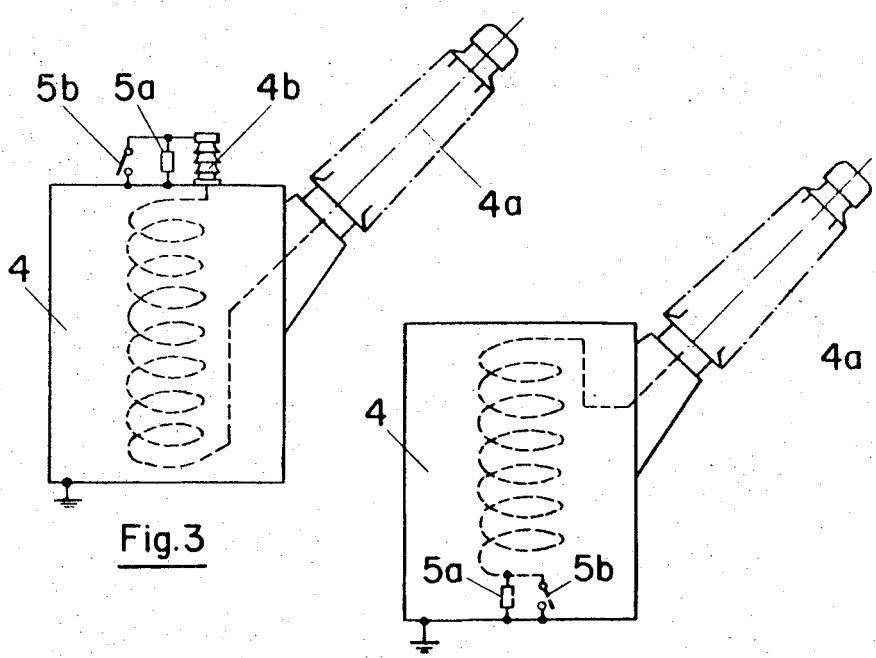
Fig.3
Fig.4
Inventor
Paul Baltensperger
By Pierce, Schiffler & Parker
Attorneys

ARRANGEMENT FOR DAMPING ELECTRICAL OSCILLATIONS ON A HIGH-VOLTAGE ALTERNATING CURRENT TRANSMISSION LINE

The present invention relates to an arrangement for damping electrical oscillations which occur on a high-voltage alternating current transmission line when a circuit breaker is opened at the end of the line, and wherein the oscillating circuit to be damped is formed by a compensating or shunt inductive reactor normally provided between the circuit breaker and the end of the line and the capacitance of the line itself.

When a high-voltage alternating current transmission line of the above-mentioned type that includes a compensating reactor at the line end is disconnected, then depending upon the conditions prevailing when the disconnection is made, electrical oscillations will occur on the disconnected line which may take a second or even longer until they die down to a harmless value. If the circuit breaker at the end of the line is, however, reclosed within a fraction of a second, which is the case for instance with the rapid reclosing method where the interruption lasts only about 0.2. second, then depending upon the phase position of the connected voltage and the oscillating voltage of the line at the instant of reconnection, it is possible that undesirable circuit conditions, for instance equalizing phenomena and overvoltages may occur and particularly unfavorable switching conditions can result when an immediate subsequent disconnection is initiated as in the case when the short interruption is unsuccessful.

The object of the present invention is to damp the oscillations which occur in the oscillating circuit formed by the line capacitance and the compensating reactor in a simple manner and at a low cost. In accordance with the invention this is achieved by arranging a resistance in series with the compensating inductive reactor, the resistance being normally shunted by a parallel switch but being briefly connected in series with the compensating reactor when the circuit breaker is opened by briefly opening and then reclosing the resistance shunting switch. The main advantage of this arrangement is that favorable damping effect is achieved with only a moderate load on the resistance and parallel switch.

A device for limiting the overvoltages on closing is known which, by means of a multiple auxiliary switch with a resistance in series, temporarily earths the output terminal of the circuit breaker on the line side when the line is switched in. Such a device is disclosed in German Pat. No. 1,233,046. The advantage of this arrangement is that the auxiliary switch and the earthing resistance are expensive and occupy a considerable space, because they have to be dimensioned for the line-to-earth voltage. The purpose of this device is to conduct away the charges from the high-voltage line.

The invention is now explained with the aid of the accompanying drawings:

FIGS. 1 and 2 show two constructional examples of the arrangement in schematic form for a single phase line.

FIGS. 3 and 4 show two possible ways of assembling the resistance, parallel switch, and compensating reactor in accordance with the diagram in FIG. 2. In FIG. 1 the high-voltage line 1 can be switched in and out at the station end by means of the circuit breaker 2 which is provided there for this purpose. Reference number 3 indicates a power supply source, which for example can consist of one or more power stations. Between circuit breaker 2 and the line 1 there is a series connection comprising a compensating reactor 4 and a resistance 5a with a bypass parallel switch 5b for the resistance. While in FIG. 1 one end of the reactor 4 is connected to earth and therefore resistance 5a and parallel switch 5b are connected at one side to the line 1, in FIG. 2 the order is reversed and this is an advantage as regards the assembly of the elements 5a, 5b they do not have to be mounted on a large expensive supporting insulator which in the case of a very high rated voltage, for instance 765 kv, is necessary and expensive. Due to the series arrangement with the compensating reactor 4, it is possible to provide a simple design of resistance 5a and parallel switch 5b as regards current-carrying capacity, because they do not have to withstand any short circuit currents. Furthermore the resistance has only to carry a fraction of the line-to-earth voltages. Circuit breaker 2 and parallel switch 5b open practically simultaneously upon a disconnection and shortly afterwards parallel switch 5b closes again, so that resistance 5a remains effective for a predetermined optimum duration, which can be between 10 and 200 ms. Parallel switch 5b can be constructed as a high-speed isolator. It only has to have a small breaking capacity and does not need to have a making capacity on a short-circuited line nor a current-carrying capacity for short circuit currents.

FIGS. 3 and 4 show how the resistance and parallel switch can be assembled together with the compensating reactor. In FIG. 3, resistance 5a and switch 5b are mounted on the casing of the reactor 4. In addition to the high-voltage bushing 4a, it is only necessary to provide a bushing 4b which is dimensioned for a very much lower voltage and serves to connect the elements 5a, 5b, to the reactor. A further expedient arrangement can be obtained when the resistance and switch are located inside the reactor casing which is filled with an insulating medium, as is shown in FIG. 4.

The arrangement according to the invention is shown in the drawing for a single phase and only for one end of the high-voltage line. It is obvious that it can be construed for several phases whereby the arrangement can be provided at both ends of the line.

I claim:

1. In combination, a source of high-voltage alternating current, a power circuit breaker for connecting one side of said source to one end of a transmission line, the other side of said source being connected to earth, a compensating circuit including an inductive reactor, a resistance connectable in series therewith and a switch connected in parallel with only said resistance, one end of said compensating circuit being connected to the end of said transmission line at the line side of said power circuit breaker and the other end of said compensating circuit being connected to earth, said switch being in a closed position when said power circuit breaker occupies its closed position thereby to bypass said resistance and connect said inductive reactor directly between said transmission line and earth, and sad switch being opened briefly upon an opening operation of aid power circuit breaker to place said resistance in series with said inductive reactor and thereby effect a damping of the resulting oscillating circuit formed by the capacitance of said transmission line and said inductive reactor.

2. Arrangement as in claim 1, characterized in that said resistance and parallel switch are located at that end of the compensating reactor which is nearer to the end of the line.

3. Arrangement as in claim 1, characterized in that said resistance and parallel switch are located at an earthed end of the compensating reactor.

4. Arrangement when used with a compensating reactor having a casing filled with insulating medium according to claim 3 characterized in that said resistance and parallel switch are mounted on the outside of the casing of the reactor.

5. Arrangement when used with a compensating reactor having a casing filled with an insulating medium according to claim 4 characterized in that said resistance and parallel switch are located inside the reactor casing.